(12) United States Patent
Tomita et al.

(10) Patent No.: US 7,028,493 B2
(45) Date of Patent: Apr. 18, 2006

(54) VEHICLE AIR CONDITIONER HAVING A SEAT AIR CONDITIONING UNIT

(75) Inventors: Hiroyuki Tomita, Nagoya (JP); Toshifumi Kamiya, Takahama (JP)

(73) Assignee: DENSO Corporation, Kariya (JP)

( * ) Notice: Subject to any disclaimer, the term of this patent is extended or adjusted under 35 U.S.C. 154(b) by 237 days.

(21) Appl. No.: 10/695,310

(22) Filed: Oct. 28, 2003

(65) Prior Publication Data

US 2004/0083745 A1 May 6, 2004

(30) Foreign Application Priority Data

Oct. 30, 2002 (JP) ............................... 2002-315481

(51) Int. Cl.
*F25D 29/00* (2006.01)
*B60H 1/32* (2006.01)
*A47C 31/00* (2006.01)
*A47C 7/02* (2006.01)

(52) U.S. Cl. ........................... 62/161; 62/163; 62/244; 297/180.14; 297/452.42; 297/452.47; 454/120; 454/907

(58) Field of Classification Search ................. 62/161, 62/244, 261, 163; 297/180.14, 452.42, 452.46, 297/452.47; 454/120, 907
See application file for complete search history.

(56) References Cited

U.S. PATENT DOCUMENTS 6,059,018 A * 5/2000 Yoshinori et al. ............. 165/42
2001/0045099 A1* 11/2001 Ohga et al. .................. 62/186

FOREIGN PATENT DOCUMENTS

JP 3111566 9/2000
JP 3146573 1/2001

* cited by examiner

*Primary Examiner*—Marc Norman
(74) *Attorney, Agent, or Firm*—Harness, Dickey & Pierce, PLC

(57) ABSTRACT

In a vehicle air conditioner, a front air conditioning unit and a seat air conditioning unit are automatically controlled by an air conditioner ECU. If a seat air conditioner switch is operated by a user during an automatic control, the setting (e.g. air volume of a seat blower) of the seat air conditioning switch is learned. Based on the learning, a seat blower characteristic diagram, which is stored in a ROM, is changed. Therefore, from this time onward, under the same environmental condition, the seat blower air volume is determined based on the changed seat blower characteristic diagram. Accordingly, a seat air conditioning is provided as desired.

12 Claims, 4 Drawing Sheets

VEHICLE AIR CONDITIONER HAVING A SEAT AIR CONDITIONING UNIT

CROSS REFERENCE TO RELATED APPLICATION

This application is based on Japanese Patent Application No. 2002-315481 filed on Oct. 30, 2002, the disclosure of which is incorporated herein by reference.

FIELD OF THE INVENTION

The present invention relates to a vehicle air conditioner having a seat air conditioning unit for producing flow of air from a seat and a method of controlling the same.

BACKGROUND OF THE INVENTION

With regard to an automatic control of a general vehicle air conditioner, a target temperature of air to be blown into a passenger compartment is calculated in relation to a setting temperature, and the control is executed based on a control characteristic with respect to the target temperature as a parameter. The control characteristic is determined to be accepted by the majority of users. Therefore, the control condition of the automatic control may not be accepted by some users who have different heat sensations, for example.

To address this matter, in Japanese Patent JP-B2-3146573 and JP-B2-3111566 for example, when the control condition is changed by user's manual switch operation during the automatic control, the changed control condition is learned. Further, it is reflected to the control characteristic of the automatic control, thereby providing a desired air conditioning.

Incidentally, with regard to the air conditioner including a seat air conditioning unit that produces warm air or cold air blowing from a seat for further improving passenger comfort, the passenger's heat sensation and comfort are likely to be governed depending on the presence or absence of the air blowing from the seat, that is, on/off condition of the seat air conditioning unit.

SUMMARY OF THE INVENTION

The present invention is made in view of the foregoing matter and it is an object of the present invention to provide a vehicle air conditioner capable of performing an air-conditioning operation as desired even when a seat air-conditioning operation is performed.

According to the present invention, an air conditioner for a vehicle includes a seat air conditioner means that produces an airflow blowing from a seat of the vehicle. A control characteristic of the seat air conditioner means is stored in a storage means. The seat air conditioner means is automatically controlled by a control means based on the control characteristic. When a manual setting means is operated to change a control condition by a user while the seat air conditioner means is automatically controlled, a setting condition of the manual setting means is learned and the control characteristic stored in the storage means is changed based on the learning.

Accordingly, when the control condition of the seat air conditioner means is changed by the operation of the manual setting means, the changed control condition is learned, and the learning is reflected to the control characteristic stored in the storage means. Therefore, it is possible to provide the seat air conditioning operation as desired by the user.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

An embodiment of the present invention will be described hereinafter with reference to the drawings.

Figure 1:
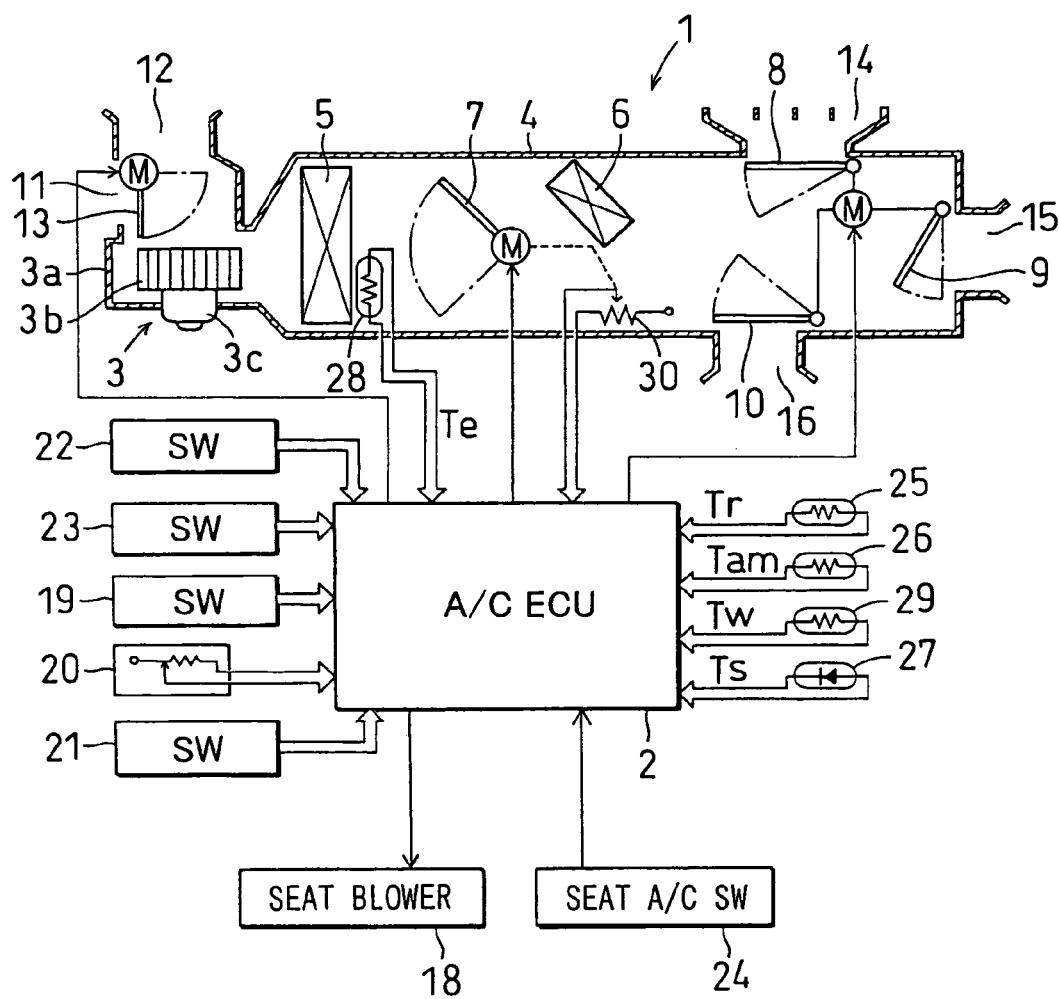
FIG. 1 is a schematic diagram of a vehicle air conditioner according to an embodiment of the present invention.

Referring to FIG. 1, the vehicle air conditioner includes a front air conditioning unit 1 for air-conditioning a passenger compartment, a seat air conditioning unit for air-conditioning a seat, and an air conditioner ECU 2 for controlling a condition of air in the passenger compartment.

First, the front air conditioning unit 1 is constructed of a blower (main blower) 3, a duct 4, an evaporator 5, a heater core 6, an air mixing door 7, air blow mode switching doors 8 through 10, and the like. The blower 3 creates a flow of air. The duct 4 defines an air passage through which the air blown by the blower 3 is introduced into the passenger compartment. The evaporator 5 is disposed in the duct 4. The heater core 6 is disposed downstream from the evaporator 5 in the duct 4. The air mixing door 7 controls a temperature of air. The air blow mode switching doors 8 through 10 switch air blow modes.

The blower 3 includes a casing 3a, a centrifugal fan 3b, a blower motor 3c. The casing 3a is integrated with an inside and outside air switching box. The centrifugal fan 3b is arranged in the casing 3a. The fan 3b is driven by the blower motor 3c. The inside and outside air switching box is formed with an inside air port 11 through which an inside air inside the passenger compartment is introduced in the box and an outside air port 12 through which an outside air outside the passenger compartment is introduced in the box. The inside air port 11 and the outside air port 12 are opened and closed by an inside and outside air switching door 13.

The duct 4 includes a cooler case for housing the evaporator 5 and a heater case for housing the heater core 6. The cooler case is for example integrally formed with the heater case. The heater case is formed with a defroster opening 14 through which the air is blown toward a windshield of the vehicle, a face opening 15 through which the air is blown toward the upper half of the passenger body, and a foot opening 16 through which the air is blown toward the lower half of the passenger body. As the above-mentioned air blow mode switching doors, a defroster door 8, a face door 9, and a foot door 10 are disposed for opening and closing the defroster opening 14, the face opening 15, and the foot opening 16, respectively.

The evaporator 5 is generally included in a refrigerant cycle. A refrigerant of the refrigerant cycle flows inside of the evaporator 5. The refrigerant, which has a low temperature, evaporates by absorbing latent heat of evaporation from the air, thereby cooling the air. That is, the evaporator 5 is a cooling heat exchanger for cooling an outside fluid. On the other hand, the heater core 6 is a heating heat exchanger. The heater core 6 performs heat exchange between the air passing outside of the heater core 6 and an engine coolant flowing inside of the heater core 6. The air mixing door 7 controls the volume of the air passing through the heater core 6 and the volume of air bypassing the heater core 6, and thereby adjusts a temperature of the air to be blown into the passenger compartment.

Figure 2:
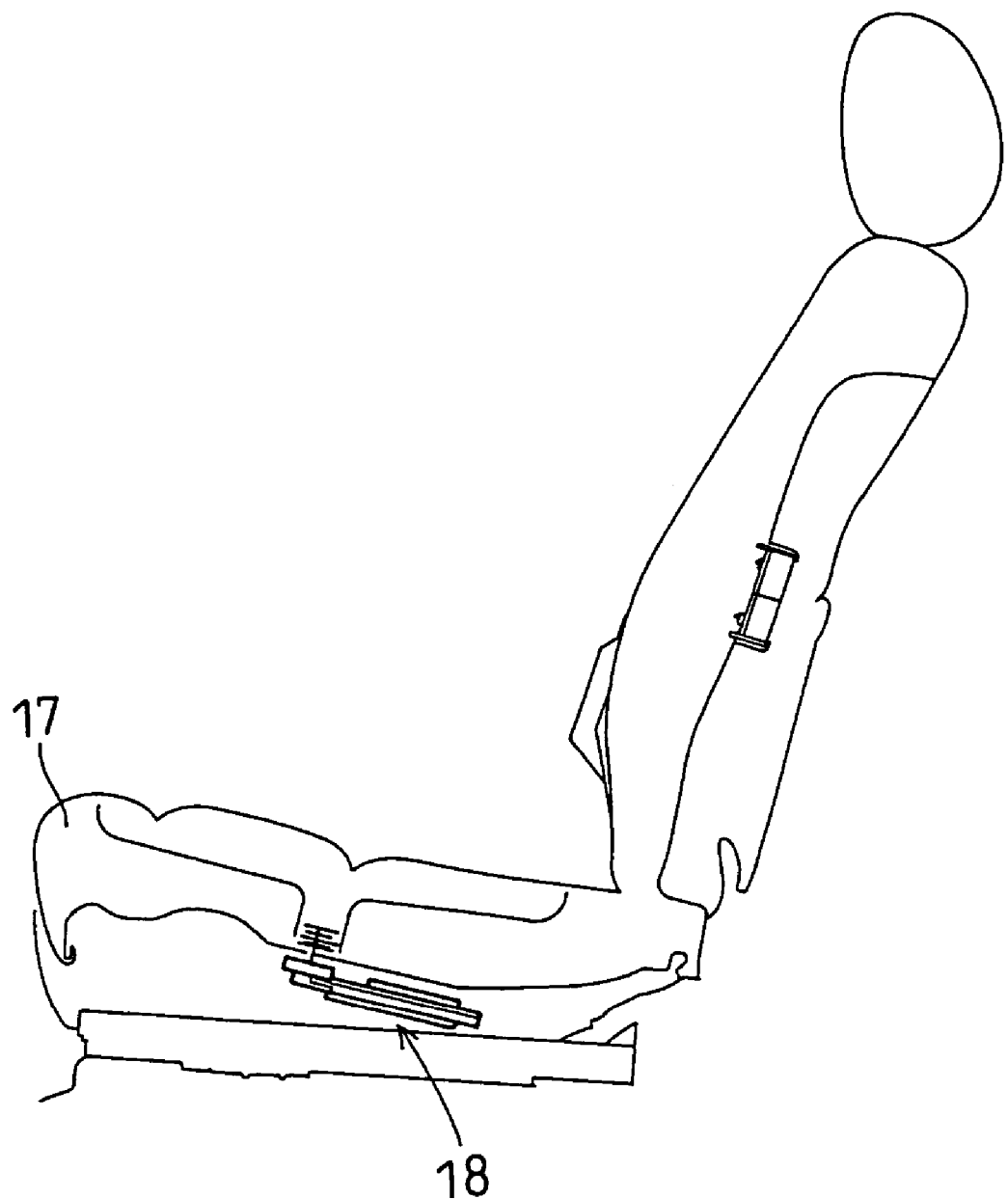
FIG. 2 is a schematic cross-sectional view of a seat air conditioning unit according to the embodiment of the present invention.

Next, as shown in FIG. 2, the seat air conditioning unit includes a seat blower 18 installed in a seat 17. When the seat blower 18 is driven, the air is sucked from the passenger compartment into the seat air conditioning unit and blown into the passenger compartment through openings formed on the seat surface. For example, the seat air conditioning unit can be connected to the front air conditioning unit 1 through a duct (not shown), so that the seat air conditioner unit receives air from the front air conditioner unit 1 and blows it from the seat surface.

The air conditioner ECU 2 is an electronic control unit having a microcomputer. When an ignition key of the vehicle is turned on, the ECU 2 starts a program by receiving power from a battery of the vehicle.

The ECU 2 reads operation signals of switches 19 through 23 operated on an air conditioner operating panel (not shown) and a seat air conditioner switch 24 and other sensor signals or sensor information detected by various sensors (described later). Based on the signals, the ECU 2 performs the air conditioning control, such as a temperature control of the air to be blown, an air intake mode control, an air outlet mode control, an air volume control of the main blower 3, an on/off control of a compressor, and an air volume control of the seat blower 18.

On the air conditioner operating panel, an automatic control switch 19, a temperature setting switch 20, an air volume setting switch 21, an intake port switching switch 22, outlet port switching switch 23 and the like are provided. An execution of the air conditioning control is ordered to the ECU 20 by the auto-control switch 19. A temperature of the passenger compartment (setting temperature Tset) is set by the temperature setting switch 20 on a level desired by the passenger. An air volume level of the blower 3 is changed stepwise or continuously by the air volume setting switch 21. An outside air mode for sucking the outside air and an inside air mode for circulating the inside air are switched by the intake port switching switch 22. Air outlet modes are selected by the outlet port switching switch 23. The seat air conditioner switch 24 includes a seat blower air volume switch that adjusts the level of the air volume, which is blown from the seat 17, stepwise or continuously.

As shown in FIG. 1, an inside air temperature sensor 25, an outside air temperature sensor 26, a solar radiation sensor 27, an evaporator downstream sensor 28, a coolant temperature sensor 29, a potentiometer 30 are included as the sensors. The inside air temperature sensor 25 detects a temperature (inside air temperature Tr) inside of the passenger compartment. The outside air temperature sensor 26 detects a temperature (outside air temperature Tam) outside of the passenger compartment. The solar radiation sensor 27 detects the amount Ts of solar radiation. The evaporator downstream sensor 28 detects a temperature (evaporator downstream temperature Te) of the air cooled by the evaporator 5. The coolant temperature sensor 29 detects a temperature (coolant temperature Tw) of the engine coolant. The potentiometer 30 detects an opening degree of the air mixing door 7.

Figure 3:
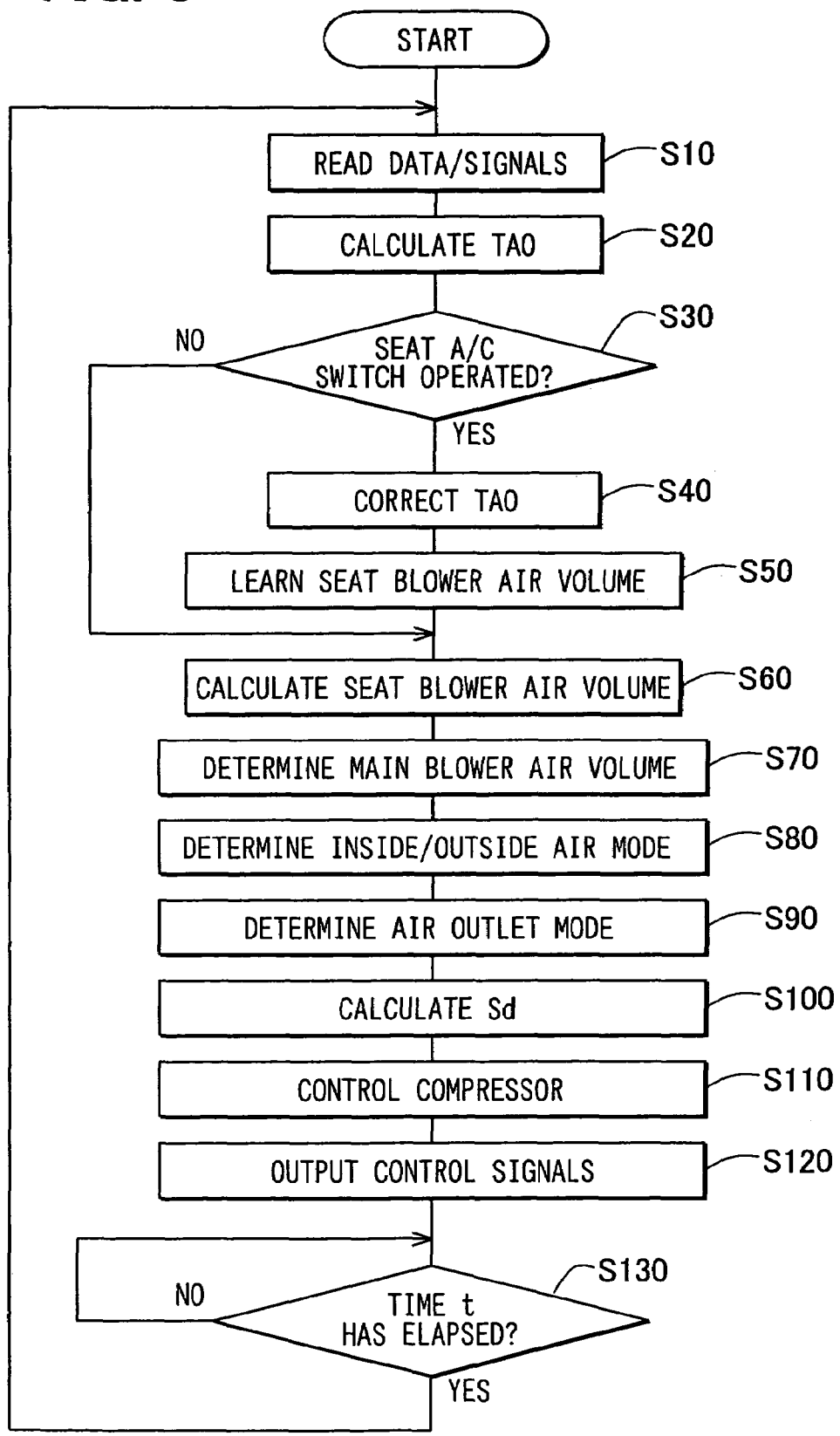
FIG. 3 is a flow chart for showing a control procedure of an air conditioner ECU according to the embodiment of the present invention.

Next, a control procedure of the air conditioner ECU 2 will be described with reference to the flow chart shown in FIG. 3. The ECU executes the air-conditioning control when the automatic control switch 19 is turned on.

At step 10, the setting temperature Tset and the data or sensor information detected by the sensors, such as the inside air temperature Tr, the outside air temperature Tam, the solar radiation amount Ts, the evaporator downstream temperature Te, the coolant temperature Tw, are read.

Next, at step 20, a target temperature TAO of the air to be blown into the passenger compartment is calculated based on a following equation 1. The equation 1 is stored in a ROM of the microcomputer, which provides a storage means.

$$TAO = Kset \times Tset - Kr \times Tr - Kam \times Tam - Ks \times Ts + C \quad \text{(Ex. 1)}$$

Here, Kset denotes a temperature setting gain. Kr denotes an inside air temperature gain. Kam denotes an outside air temperature gain. Ks denotes a solar radiation gain. C denotes a correction gain.

Next, at step 30, it is determined whether the seat air conditioner switch 24 is operated. If it is determined that the seat air conditioner switch 24 is operated, the control continues to step 40. On the other hand, if it is determined that the seat air conditioner switch 24 is not operated, the control continues to step 60.

At step 40, the target temperature TAO, which is calculated at step 20, is corrected in accordance with a change degree of the seat air conditioner switch 24. For example, if the air volume level of the seat blower 18 is increased during a cooling operation, the target temperature TAO is increased in accordance with the increase in the air volume level. If the air volume level of the seat blower 18 is increased during a heating operation, the target temperature TAO is reduced in accordance with the increase in the air volume level.

Next, at step 50, a correlation between the target temperature TAO when the switch 24 is operated and the changed air volume of the seat blower 18 is learned. That is, values (constants) A through G of FIG. 4 are learned.

Figure 4:
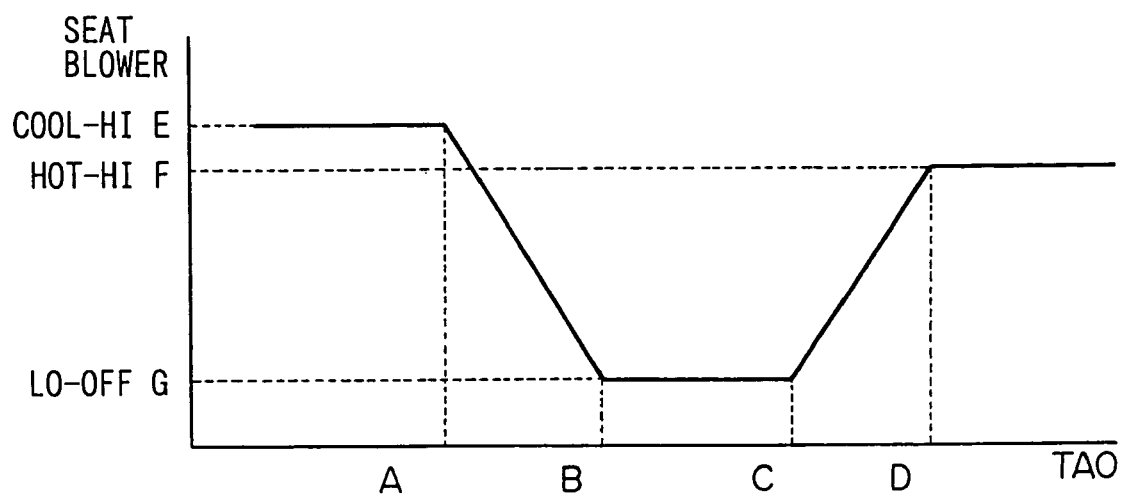
FIG. 4 is a graph for showing a characteristic of a blower of the seat air conditioning unit according to the embodiment of the present invention.

Then, at step 60, the air volume of the seat blower 18 is calculated with respect to the target temperature TAO based on a characteristic diagram of the seat blower 18 shown in FIG. 4. The characteristic of the seat blower 18 is stored in the ROM (e.g. EEPROM) of the microcomputer.

Next, at step 70, the air volume of the main blower 3 is determined based on the target temperature TAO. Then, at step 80, the inside/outside air mode is determined based on the target temperature TAO. At step 90, the air outlet mode is determined based on the target temperature TAO.

Next, at step 100, a target opening degree Sd of the air mixing door 7 is calculated based on a following equation 2. The equation 2 is stored in the ROM.

$$Sd = \{(TAO - Te)/(Tw - Te)\} \times 100 \ (\%) \quad \text{(Ex.2)}$$

Next, at step 110, a control condition (on/off) of the compressor is determined based on a target evaporator downstream temperature, which is a target temperature of the air cooled by the evaporator 5. Next, at step 120, control signals are sent to respective control devices such as servomotors and driving circuits so that the control target values determined at steps 60 through 110 are achieved. Next, at step 130, the control is placed into a standby mode until a predetermined time period t elapses. After the predetermined time period t, the procedure from step 10 to step 130 is repeated.

Next, advantageous effects of the present invention will be described.

While the front air conditioning unit 1 and the seat air conditioning unit (e.g. seat blower 18) are automatically controlled by the ECU 2, if the seat air conditioner switch 24 is operated by the user, the setting of the switch 24 (e.g. air volume level of the seat blower 18) is learned. Based on the learning, the characteristic diagram of the seat blower 18, which is stored in the ROM, is changed. Therefore, from this time onward, under the same environmental condition, that is, under the same target temperature TAO, the air volume of the seat blower 18 is determined based on the changed blower characteristic diagram. Accordingly, the air-conditioning of the seat 17 is provided as desired by the user.

Further, when the air volume of the seat blower 18 is changed by the users switch operation, the target temperature TAO is corrected in accordance with the change degree of the air volume. Therefore, it is less likely that the air-conditioning of the passenger compartment will be affected by the change of the air volume of the seat blower 18. Accordingly, it is possible to provide comfortable air-conditioned space.

Modifications

Figure 5:
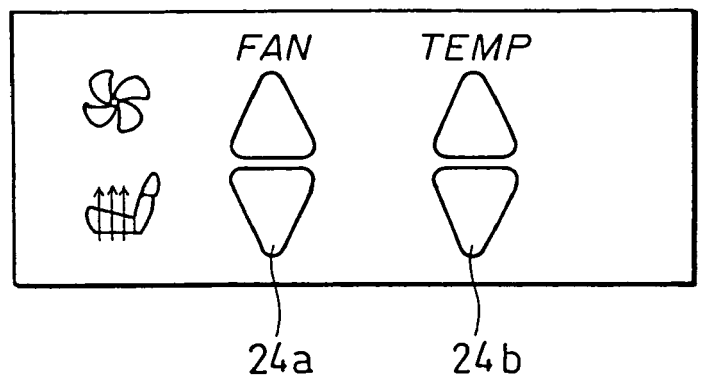
FIG. 5 is a plan view of a switch of the seat air conditioning unit according to a modified embodiment of the present invention.

In the above embodiment, the seat air conditioner switch 24 includes the seat blower air volume switch that changes the volume level of the air to be blown from the seat 17. Alternatively, as shown in FIG. 5, the seat air conditioner switch 24 can include a seat temperature switch 24b in addition to the seat blower air volume switch 24a, for example. A temperature of the air to be blown from the seat 17 is controlled by the seat temperature switch 24b. In this case, an air mixing door (not shown) for the seat air conditioner can be provided in the front air conditioning unit 1 in addition to the air mixing door 7 so that the temperature of the air to be blown from the seat 17 is changed by adjusting the opening degree of the seat air mixing door. Here, the air the temperature of which is controlled by the seat air mixing door is supplied to the seat air conditioning unit (seat blower 18) through the duct (not shown).

Further, during the automatic control by the ECU 2, if the seat temperature switch 24b is operated by the user, the target temperature TAO can be corrected by learning the changed temperature of the seat air conditioner. Therefore, from this time onward, under the same environmental condition, the seat air-conditioning operation is performed based on the corrected target temperature TAO. Accordingly, the comfort seat air-conditioning can be provided as desired by the user. Here, in the case that the seat air mixing door is provided, a seat target temperature TAO for the seat air-conditioning is calculated, separately from the target temperature TAO of the passenger compartment air-conditioning. When the seat temperature switch 24b is operated by the user, the seat target temperature TAO of the seat air-conditioning can be corrected.

Further, when the seat air conditioner switch 24 is operated by the user and the setting learned as described above, the learning result can be applied to an air-conditioning operation of another seat. That is, when the control condition of the seat air-conditioning of a first seat is changed by the manual switch operation, the changed control condition can be applied to air-conditioning operation of a second seat. Therefore, the control conditions of the plural seats can be changed together by operating the switch 24 of one of the seats.

The present invention should not be limited to the disclosed embodiments, but may be implemented in other ways without departing from the spirit of the invention.

What is claimed is:

1. An air conditioner for a vehicle comprising:
    seat air conditioner means for producing air blowing from a seat of the vehicle;
    storage means for storing a control characteristic of the seat air conditioner means;
    control means for automatically controlling the seat air conditioner means based on the control characteristic stored in the storage means;
    manual setting means for setting a control condition of the seat air conditioner means;
    compartment air conditioner means for air-conditioning a passenger compartment of the vehicle;
    target temperature calculating means for calculating a target temperature of air to be blown into the passenger compartment with respect to a setting temperature of the passenger compartment, wherein the control means automatically controls the compartment air conditioner means based on the target temperature; and,
    target temperature correcting means for correcting the target temperature in accordance with a change of the control condition of the seat air conditioner means when the control condition of the seat air conditioner means is changed by operation of the manual setting means;
    wherein when the manual setting means is operated during an automatic control of the seat air conditioner means, a setting condition of the manual setting means is learned and the control characteristic is changed based on the learning.

2. The air conditioner according to claim 1,
    wherein the compartment air conditioner means includes a front air conditioner unit having a main blower, a temperature control device, and an air outlet through which air is blown into the passenger compartment.

3. The air conditioner according to claim 2, further comprising:
    a seat air volume calculating means for calculating a volume of air to be blown from the seat with respect to the target temperature based on the control characteristic stored in the storage means;
    a main blower level determining means for determining a volume of air to be blown by the main blower based on the target temperature;
    an air outlet mode determining means for determining a mode of the air outlet of the front air conditioning unit based on the target temperature; and
    a device controlling means for controlling the temperature control device based on the target temperature.

4. The air conditioner according to claim 1,
    wherein the seat air conditioner means includes a seat blower,
    wherein the target temperature correcting means includes a function of increasing the target temperature in accordance with an increase in an air volume of the seat blower by operation of the manual setting means during a cooling operation.

5. The air conditioner according to claim 1,
    wherein the seat air conditioner means includes a seat blower,
    wherein the target temperature correcting means includes a function of reducing the target temperature in accordance with an increase in an air volume of the seat blower by operation of the manual setting means during a heating operation.

6. The air conditioner according to claim 1, wherein the seat air conditioner means includes a seat blower, wherein the control characteristic of the seat air conditioner means is provided by a relationship between the target temperature and the air volume of the seat blower, wherein the target temperature correcting means includes a function of correcting constants of the control characteristic for learning a correlation between the target temperature when the setting means is operated and the changed air volume of the seat blower.

7. An air conditioner for a vehicle comprising:

seat air conditioner means for producing air blowing from a seat of the vehicle;

storage means for storing a control characteristic of the seat air conditioner means;

control means for automatically controlling the seat air conditioner means based on the control characteristic stored in the storage means;

manual setting means for setting a control condition of the seat air conditioner means; and a first seat and a second seat respectively air-conditioned by the seat air conditioner means, wherein when the manual setting means is operated during an automatic control of the seat air conditioner means, a setting condition of the manual setting means is learned and the control characteristic is changed based on the learning; and wherein when an air-conditioning control of the first seat is changed by operating the manual setting means, the learning is applied to an air-conditioning control of the second seat.

8. A method of controlling a vehicle air conditioner having a front air conditioner unit for air-conditioning a passenger compartment of a vehicle and a seat air conditioner unit for air-conditioning a seat of the vehicle by a seat blower, the method comprising:

calculating a target temperature of air to be blown into the passenger compartment with respect to a setting temperature of the passenger compartment while the front air conditioner unit is automatically controlled by a control means;

determining whether a switch of the seat blower for changing an air blow level is operated;

correcting the target temperature in accordance with a change of the switch when it is determined that the switch is operated;

calculating a volume of air to be blown by the seat blower based on a seat blower characteristic stored in a storage means with respect to the target temperature; and determining a volume of air to be blown by a main blower of the front air conditioner unit based on the target temperature.

9. The method according to claim 8, further comprising:

determining air outlet modes of the front air conditioner unit; and controlling a temperature controlling device of the front air conditioner unit based on the target temperature.

10. The method according to claim 8, wherein when the air volume of the seat blower is increased by operation of the switch during a cooling operation, the correcting step increases the target temperature in accordance with an increase in the air volume.

11. The method according to claim 8, wherein when the air volume of the seat blower is increased by operation of the switch during a heating operation, the correcting step reduces the target temperature in accordance with an increase in the air volume.

12. The method according to claim 8, wherein the correcting step corrects constants of the blower characteristic for learning a correlation between the target temperature at a time that the switch of the seat blower is operated and the changed air volume of the seat blower.

* * * * *